United States Patent
Klandt et al.

(10) Patent No.: US 9,594,610 B2
(45) Date of Patent: Mar. 14, 2017

(54) METHOD AND SYSTEM FOR PROCESSING MULTIMODAL INPUT SIGNALS

(71) Applicant: VOLKSWAGEN AG, Wolfsburg (DE)

(72) Inventors: Jesko Klandt, Berlin (DE); Johannes Neuber, Berlin (DE); Janine Perkuhn, Berlin (DE); Stefan Schulz, Berlin (DE); Thomas Werner, Penzlin (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 15/229,899

(22) Filed: Aug. 5, 2016

(65) Prior Publication Data

US 2017/0039097 A1   Feb. 9, 2017

(30) Foreign Application Priority Data

Aug. 6, 2015 (DE) .................... 10 2015 215 044

(51) Int. Cl.
| | |
|---|---|
| G06F 3/00 | (2006.01) |
| G06F 9/46 | (2006.01) |
| G06F 9/54 | (2006.01) |
| G06F 3/01 | (2006.01) |
| G06F 9/48 | (2006.01) |

(52) U.S. Cl.
CPC .............. G06F 9/546 (2013.01); G06F 3/017 (2013.01); G06F 9/4881 (2013.01); G06F 9/54 (2013.01)

(58) Field of Classification Search
CPC ........................................................ G06F 9/54
USPC ........................................ 719/310; 718/104
See application file for complete search history.

(56) References Cited

U.S. PATENT DOCUMENTS

| | | | |
|---|---|---|---|
| 2005/0289540 A1* | 12/2005 | Nguyen | .............. G06F 9/45558 718/1 |
| 2007/0260972 A1 | 11/2007 | Anderl | |
| 2012/0222004 A1* | 8/2012 | Labat | ........................ G06F 9/50 717/120 |
| 2013/0159350 A1 | 6/2013 | Sankar et al. | |
| 2015/0019227 A1 | 1/2015 | Anandarajah | |

FOREIGN PATENT DOCUMENTS

| | | |
|---|---|---|
| DE | 20015605 U1 | 11/2000 |
| DE | 102008051756 A1 | 5/2009 |
| WO | 2014059397 A1 | 4/2014 |

OTHER PUBLICATIONS

Paul Viola, Rapid Object Detection Using a Boosted Cascade of Simple Features, 2001.*

* cited by examiner

*Primary Examiner* — Lechi Truong
(74) *Attorney, Agent, or Firm* — Barnes & Thornburg LLP

(57) ABSTRACT

A method and a system for processing multimodal input signals, wherein the system includes a merging unit which receives instruction messages from a sensor data evaluation device, which messages each indicate an instruction which can be executed by an application which can be coupled to the merging unit. For at least two of the instruction messages, the merging unit respectively generates a candidate object for the instruction message, the candidate object respectively indicating the instruction and respectively including a validity time specification of the candidate object. The merging unit also merges two of the candidate objects if the validity time specifications of these candidate objects indicate overlapping validity times and to forward an instruction to the application, which instruction is indicated by a candidate object which results from the merging operation.

13 Claims, 2 Drawing Sheets

METHOD AND SYSTEM FOR PROCESSING MULTIMODAL INPUT SIGNALS

PRIORITY CLAIM

This patent application claims priority to German Patent Application No. 10 2015 215 044.5, filed 6 Aug. 2015, the disclosure of which is incorporated herein by reference in its entirety.

SUMMARY

Illustrative embodiments relate to a method and a system for processing multimodal input signals.

BRIEF DESCRIPTION OF THE DRAWINGS

Disclosed embodiments are explained by way of example below using the associated drawings, in which.

DETAILED DESCRIPTION

Figure 1:
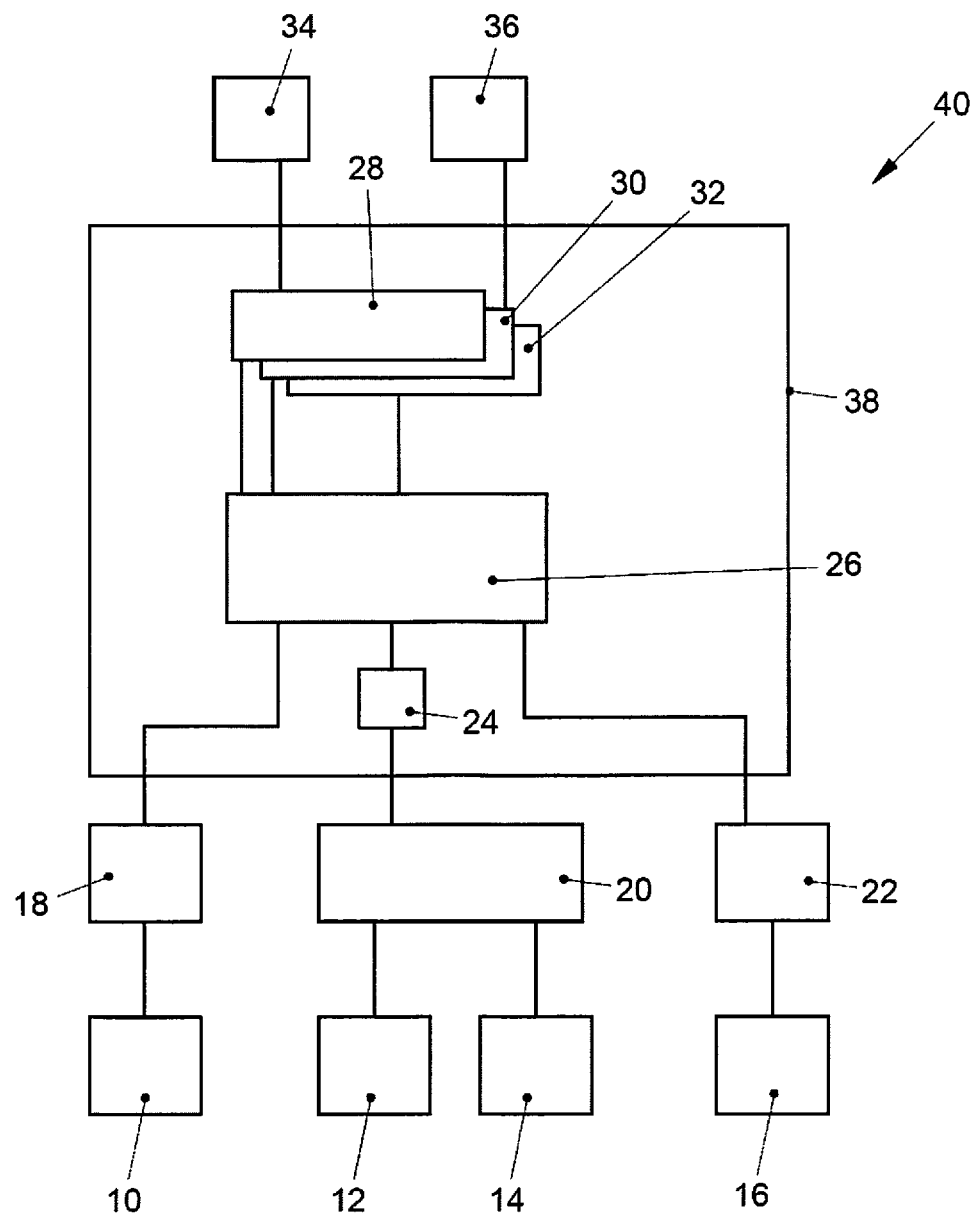
FIG. 1 shows a disclosed embodiment of a system for processing multimodal input signals.

Multimodal man-machine interfaces ("MMI") allow a user to input instructions to an application using specific, predefined input signals in various ways, for example, via contact-bound inputs using a keyboard, a mouse, a touchpad or the like, by means of voice input, via gestures of the body, the hand or individual fingers of a hand or via detected movement of the eyes (so-called "eye tracking").

A predefined input signal can be assigned in this case to an instruction for each modality. The voice input signal "further" can be assigned, for example, with respect to the modality of voice input, to an instruction of "scroll further" in a document or a menu, which can be used, for example, to operate an application for reading an e-book or a vehicle assistance system, whereas the instruction can be coupled to a swiping movement in a predefined direction with respect to a gesture input.

Such multimodal man-machine interfaces can be used to operate or control various computer-assisted systems, for example, also a driver assistance system in a motor vehicle.

Input signals of different modalities can be input in succession in this case and can be processed to form an overall item of input information. This is then referred to as alternating multimodality. It is more interesting—and technically more sophisticated—to process input signals of different modalities, which are input in a parallel manner or at the same time, that is to say a gesture accompanied by a voice input, for example, to form an overall item of information. This is then referred to as synergistic multimodality.

Disclosed embodiments provide a method and a system which allow input signals which have been input in a parallel manner or at the same time via different modalities to be processed reliably and with a high degree of robustness.

One disclosed embodiment comprises a method in a merging unit of a system for processing multimodal input signals.

In this case, the merging unit receives instruction messages from at least one sensor data evaluation device, the instruction messages each indicating an instruction which can be executed by an application which can be coupled to the merging unit. The merging unit then respectively generates a candidate object for the respective instruction message for at least two of the instruction messages. Such a candidate object respectively indicates the instruction indicated in the instruction message and comprises a validity time specification of the candidate object. The merging unit merges two of the candidate objects if the validity time specifications of these candidate objects indicate overlapping validity times and forwards such an instruction which is indicated by a candidate object resulting from the merging operation to the application.

In connection with the disclosed embodiments, the term of merging two candidate objects can be broadly interpreted to the effect that this operation does not necessarily have to generate a new candidate object resulting from the two merged candidate objects. This is merely one option amongst others. According to a second option, the two candidate objects can result from the merging operation unchanged. This is the case if the instructions indicated by the respective candidate objects do not compete. The term of competing instructions is explained in detail below. According to a third option, it may finally be the case that one or both candidate objects is/are deleted in the merging operation. In other words, it is possible for a candidate object to no longer result from a merging operation.

The validity time specification of a candidate object generally indicates a validity time within which an instruction indicated by the candidate object can compete with other instructions indicated by other candidate objects. In this case, the validity time specification can indicate one or more times or one or more intervals of time or a combination of times and intervals of time. In the sense of the disclosed embodiments, a first validity time which is indicated by a validity time specification of a first candidate object overlaps a second validity time indicated by a validity time specification of a second candidate object if the first validity time temporally overlaps the second validity time. There is a temporal overlap if a first validity time comprises a first time and a second validity time comprises a second time which is the same as the first time. There is also a temporal overlap if a first validity time comprises a time and a second validity time comprises an interval of time and the time is in the interval of time. There is also a temporal overlap if a first validity time comprises a first interval of time and a second validity time comprises a second interval of time and the first interval of time has at least one time in common with the second interval of time. The validity time of a candidate object will generally comprise at least one interval of time. For reasons of easier readability, the text below often refers to a validity period of a candidate object. In the sense of the disclosed embodiments, such a validity period can be understood as meaning the validity time of the candidate object indicated by the validity time specification of the candidate object.

Another disclosed embodiment relates to a merging unit for a system for processing multimodal input signals. In this case, the merging unit is set up and intended to receive instruction messages from at least one sensor data evaluation device, which messages each indicate an instruction which can be executed by an application which can be coupled to the merging unit. The merging unit is also set up to respectively generate a candidate object of the type stated above for at least two of the instruction messages, which candidate object indicates the respective instruction and comprises a validity time specification. The merging unit is finally set up to merge two of the candidate objects if the validity time specifications of these candidate objects indicate overlapping validity times and to forward an instruction to the application, which instruction is indicated by a candidate object resulting from the merging operation.

The practice of generating a candidate object for a received instruction message makes it possible to compare instruction messages, which relate to input signals acquired in a parallel manner or at the same time, with one another. Competing or contradictory instructions can be recognized and possibly deleted in this case. Instructions which are compatible with one another and have been acquired using different modalities can be combined and can be processed further as a common instruction. In summary, the concept of introducing a candidate object allows instruction messages, which come from input signals acquired at the same time or in a parallel manner, to be merged in a suitable manner. This results in robust recognition of the input signals and a high recognition rate, as is described in detail below.

Further disclosed embodiments emerge from the remaining features mentioned.

As mentioned, the merging unit receives a plurality of instruction messages, a first instruction message and a second instruction message. In this case, the second instruction message differs from the first instruction message. A second sensor data evaluation device which has been used to receive the second instruction message can, on the one hand, match a first sensor data evaluation device which has been used to receive the first instruction message or, on the other hand, may differ therefrom.

As already described above generally for an instruction message, for example, the first instruction message, the merging unit also generates a second candidate object for the second instruction message, the second candidate object indicating the second instruction and comprising a validity time specification of the second candidate object. The first candidate object and the second candidate object may each additionally comprise a weighting of the first and/or second candidate object.

Specifically, the merging unit can now merge the first candidate object with the second candidate object on the basis of the weighting of the first candidate object and the weighting of the second candidate object if the validity time specification of the first candidate object indicates a first validity time which overlaps a second validity time indicated by the validity time specification of the second candidate object and if the first instruction competes with the second instruction.

In the sense of the disclosed embodiments, a first instruction generally competes with a second instruction if the first instruction and the second instruction belong to the same instruction class. Instructions in the same instruction class relate to a common technical aspect with respect to an application which is set up to execute the instructions in the instruction class. Instructions in an instruction class may be, for example, those instructions which control the movement of an input element, for example, a cursor ("up", "down", "left", "right"). Another instruction class may comprise, for example, instructions for navigating in a document, a menu or the like ("scroll forward or scroll back"). A third instruction class may comprise, for example, instructions for actuating an input element ("click", "double-click", prolonged "click" (with pressure or duration)).

As explained below, competing instructions can be compatible with one another, on the one hand. This relates to the situation in which the instructions are substantially identical and can be interpreted as a common instruction. On the other hand, competing instructions may be in conflict with one another. This is the case if the instructions are so different that they are not compatible with one another.

According to a first disclosed embodiment, the first candidate object or the second candidate object or both candidate objects can be deleted in the operation of merging the first candidate object with the second candidate object if the first instruction is in conflict with the second instruction. The candidate object which has not been deleted, if such a candidate object remains, then results from the merging operation unchanged.

In the sense of the disclosed embodiments, a first instruction is generally in conflict with a second instruction if the first instruction and the second instruction are incompatible with one another or contradict one another. With respect to the instruction class which was mentioned above by way of example and has instructions comprising navigation in a document or a menu, the instructions "scroll forward" and "scroll back" are in conflict with one another since they are contradictory and incompatible. In the same manner, an instruction for moving a cursor "to the right" is in conflict with an instruction for moving a cursor "to the left", for example.

A deleted candidate object does not influence the further method; a deleted candidate object does not influence any of the other candidate objects, either with regard to an indicated instruction or with regard to a validity time specification or a weighting.

In the event of a conflict, at least that candidate object which has a weighting lower than the weighting of the respective other candidate object is generally deleted in the merging operation. In the event of the weighting of both candidate objects not exceeding a predefined value, for example, provision may also be made for both candidate objects to be deleted, however.

According to a second disclosed embodiment, a merged candidate object is formed from the first candidate object and the second candidate object in the merging operation if the first instruction and the second instruction are compatible with one another. This merged candidate object which results from the merging operation then replaces the first and second candidate objects which can each be considered to have been deleted. However, in contrast with the first disclosed embodiment, the first and second candidate objects survive in the merged candidate object and therefore influence the further method.

In the sense of the disclosed embodiments, a first instruction and a second instruction are generally compatible with one another if the first instruction is the same as the second instruction. A first instruction and a second instruction are also considered to be compatible when the first instruction is specified by one or more first instruction parameters and the second instruction is specified by one or more second instruction parameters and corresponding first and second instruction parameters are each within a predefined compatibility tolerance range. An instruction for actuating an input device at predefined X and Y coordinates (for example, "click (x=1000, y=500)") may be compatible, for example, with a corresponding instruction (for example, "click (x=992, y=507)") if the X and Y coordinates specified by the respective instructions as instruction parameters are sufficiently close together, that is to say are in the stated compatibility tolerance range which may comprise a value of 10 in the X and Y directions in each case, for example.

The instruction which is then indicated by the merged candidate object is derived from the first instruction or from the second instruction or from the first instruction and the second instruction. The instruction indicated by the merged candidate object may correspond to the first instruction if the first instruction matches the second instruction.

If the first instruction is specified by one or more first instruction parameters and the second instruction is specified by one or more second instruction parameters and corresponding first and second instruction parameters are each within a predefined similarity tolerance range which is generally smaller than the compatibility tolerance range mentioned (and allows only a deviation by 5 instead of 10 with respect to the preceding example), the instruction indicated by the merged candidate object may correspond to the first instruction or to the second instruction.

If the second instruction does not substantially correspond to the first instruction, that is to say the respective instruction parameters are indeed within the predefined compatibility tolerance range but are not within the predefined similarity tolerance range, the instruction indicated by the merged candidate object can be specified by one or more third instruction parameters which are each within the corresponding compatibility tolerance range with respect to the corresponding first and second instruction parameters. Such a third instruction parameter could be respectively formed, for example, by forming approximately a mean value between corresponding first and second instruction parameters ("click (x=996, y=503)" with respect to the preceding example).

The validity time specification of the merged candidate object is derived from the validity time specification of the first candidate object or from the validity time specification of the second candidate object or from the validity time specification of the first candidate object and the validity time specification of the second candidate object. As already mentioned, the validity time specification of a candidate object generally indicates a validity time within which an instruction indicated by the candidate object can compete with other instructions. The validity time specification of a candidate object can consequently be specifically separately determined for each candidate object in each case on the basis of various parameters.

The validity period of a candidate object, which is indicated by the validity time specification, may be generated on the basis of the indicated instruction and on the basis of the instruction message for which the candidate object has been generated.

Instructions in different instruction classes generally require different validity periods. For example, instructions for moving an input element, for example, a cursor, are transmitted to the merging unit at very short intervals of time. Consequently, the corresponding validity periods of these instructions are very short in comparison with, for example, instructions for navigation in a document, for example, for turning over pages in the document. In other words, this means that the validity period of a candidate object can be generated on the basis of a modality which is assigned a first sensor device which has acquired sensor data, on the basis of which the first sensor data evaluation device has generated the first instruction message. In other words again, the determination of the validity period of the corresponding candidate object which is generated for the instruction message can vary depending on whether the first instruction message has been input by a voice input, a gesture input, the detection of the pupils of a user or an input via a touchpad.

In this case, according to a first disclosed embodiment, the validity period of the merged candidate object may correspond to the validity period of the first candidate object. According to a second disclosed embodiment, the validity period of the merged candidate object may correspond to the validity period of the second candidate object. According to a third disclosed embodiment, the validity period of the merged candidate object may correspond to a validity period which is included in the intersection of the validity period of the first candidate object with the validity period of the second candidate object. According to a fourth disclosed embodiment, the validity period of the merged candidate object can finally correspond to a validity period included in the combination of the validity period of the first candidate object with the validity period of the second candidate object.

The weighting of the merged candidate object is derived from the weighting of the first candidate object or from the weighting of the second candidate object or from the weighting of the first candidate object and the weighting of the second candidate object. The weighting of a candidate object generally indicates what significance is assigned to the candidate object in comparison with other candidate objects. A higher weighting emphasizes a priority of a candidate object over other candidate objects with an accordingly lower weighting. It goes without saying that the weighting of the first candidate object, for example, can be generated on the basis of the first instruction message indicated by the first candidate object.

This makes it possible to express the priority of an instruction over other instructions in the weighting of the candidate object. As already described with respect to the validity period, the weighting of the first candidate object can also be generated on the basis of a modality which has been used to acquire the first instruction message indicated by the first candidate object.

The weighting of the merged candidate object will generally exceed the weighting of the first candidate object and the weighting of the second candidate object. To determine the weighting of the merged candidate object, the corresponding weightings of the first and second candidate objects can be summed in a suitable manner, for example, or can be mathematically combined in another suitable manner.

According to the third disclosed embodiment already briefly explained above, both candidate objects result from the merging operation unchanged again if the instruction indicated by the first candidate object does not compete with the instruction indicated by the second candidate object. The fact that this is also referred to as merging substantially has to do with the fact that this simplifies a specific implementation of the merging process since only the validity periods of the respective candidate objects then need to be considered if a pair of candidates is selected for merging.

An instruction message which is received from a sensor data evaluation device by the merging unit can comprise further parameters in addition to the indication of the instruction.

According to a first disclosed embodiment, the instruction message may comprise a sensor device parameter which indicates a sensor device which has provided sensor data, on the basis of which the sensor data evaluation device has generated the instruction message. In other words, the parameter can indicate, for example, that the instruction message has been recognized on the basis of image data which have been acquired and provided by a camera device.

According to a second disclosed embodiment, the instruction message may comprise an application parameter. Such an application parameter specifies one or more applications which are set up or provided for the purpose of executing the instruction. An application which is set up, for example, to execute instructions for scrolling forward and back in a document or a menu may be part of a vehicle assistance system of a motor vehicle.

According to a third disclosed embodiment, the instruction message may comprise an acquisition time parameter. Such a parameter may specify an acquisition interval of time within which sensor data have been acquired by a sensor device, on the basis of which data the corresponding sensor data evaluation device has generated the instruction message.

According to a fourth disclosed embodiment, the instruction message may comprise a recognition time parameter which specifies a recognition time at which the sensor data evaluation device has recognized the instruction indicated in the instruction message from sensor data received by a sensor device.

It goes without saying that the validity time specification of a candidate object may be determined on the basis of the acquisition time parameter or the recognition time parameter or on the basis of both of these parameters.

According to a fifth disclosed embodiment, the instruction message may comprise a confidence parameter. Such a confidence parameter specifies how reliably the sensor data evaluation device has recognized the instruction indicated in the instruction message from sensor data received by a sensor device. The confidence parameter can therefore be used to quantify any uncertainties relating to the recognition of the instruction and to include them in the merging process. Such a confidence parameter will generally assume a value between 0 and 1 or between 0 and 100, a value at the top end of such a range respectively signifying a high degree of reliability of the recognition of the instruction.

It goes without saying that the weighting of a candidate object can also be determined on the basis of the corresponding confidence parameter of the instruction message. The confidence parameter will generally be concomitantly included in the determination of the weighting of the candidate object in a predefined manner.

Moreover, it goes without saying that the disclosed embodiments described above can be combined with one another in any desired manner.

As already indicated above, a first sensor device which has acquired sensor data, on the basis of which a first sensor data evaluation device has generated a first instruction message, can be assigned to a first modality which differs from a second modality assigned to a second sensor device which has acquired sensor data, on the basis of which a second sensor data evaluation device has generated a second instruction message. Simply put, this means that instruction messages which have been acquired and recognized on the basis of different modalities can be processed. Corresponding modalities are, for example, voice recognition, gesture recognition, detection of the viewing direction, a mechanical input via a keyboard, a mouse or a touchpad and the like.

In combination with the fact that a first candidate object is merged with a second candidate object when the corresponding validity periods overlap, this results in the fact that the method described in the present case is suitable and set up to support synergistic multimodality, that is to say a situation in which input signals from different modalities are input in a parallel manner or at the same time and are processed to form an overall item of information.

The method will generally comprise a further operation for each candidate object which has not been deleted before the expiry of its validity period. According to this operation, the instruction indicated by the candidate object is forwarded to an application which is coupled to the merging unit and is suitable or intended to execute the instruction. A candidate object which has not been deleted before the expiry of its validity period has therefore won through over other competing or even conflicting candidate objects. This may be a candidate object originally generated for a received instruction message or else a merged candidate object, that is to say a candidate object newly generated during the merging process.

According to at least one disclosed embodiment of the method described above, the first candidate object, or generally each candidate object generated by the merging unit, may comprise a merging parameter. Such a merging parameter indicates whether and—if so—the time at which the first candidate object is provided for potential merging with a further candidate object.

According to a first disclosed embodiment, the merging parameter can indicate that the first instruction indicated by the first candidate object is immediately forwarded to an application which is coupled to the merging unit and is suitable or intended to execute the first instruction. In other words, the instruction indicated by the candidate object is forwarded before the candidate object is possibly supplied to a merging process described above. This may be useful for instructions which are very time-critical or have a very high priority.

The merging parameter may also indicate that the first candidate object, after the first instruction indicated by the first candidate object has been forwarded, is provided for potential merging with those further candidate objects which indicate a further instruction which is in conflict with the first instruction. In other words, merging of the candidate object with candidate objects which indicate compatible instructions is no longer provided here. In this case, the merging parameter may also indicate that the application indicated by the first candidate object is no longer forwarded if the first candidate object has not been deleted before the expiry of its validity period.

Alternatively, the merging parameter may also furthermore indicate that the first candidate object, after the first instruction indicated by the first candidate object has been forwarded, is not provided for potential merging with further candidate objects. In other words, the candidate object is therefore completely removed from the merging process.

According to a second disclosed embodiment, the merging parameter may indicate that the first instruction indicated by the first candidate object is forwarded, after expiry of the validity period of the first candidate object, to an application which is coupled to the merging unit and is suitable or intended to execute the first instruction. This may also apply when the first candidate object is considered to have been deleted after expiry of the validity period. According to this disclosed embodiment, only those candidate objects whose instructions are in conflict with the first instruction are likewise provided for potential merging with the first candidate object.

Communication between a sensor device and a sensor data evaluation device for the purpose of transmitting sensor data acquired by the sensor device, or communication between a sensor data evaluation device and the merging unit for the purpose of transmitting an instruction message, or communication between the merging unit and an application coupled to the merging unit for the purpose of forwarding an instruction can generally be carried out in a simple manner using sockets, for instance, TCP sockets. This makes it possible to include additional sensor units and/or applications in the system without any problems. Other suitable communication methods and protocols can likewise be used.

According to at least one disclosed embodiment, an instruction message is coded in the JSON data format. This standardized data format provides a data format which is easily comprehensible, can be read easily and can be processed easily using known means and also allows a varying number of parameters to be included in a simple manner.

Before the first instruction message is received, the method described above comprises the following operations: an input signal which has been stated by a user of the system is acquired as sensor data by a first sensor device. The received sensor data are forwarded to a first sensor data evaluation device which recognizes an instruction for an application which can be coupled to the merging unit from the sensor data. The sensor data evaluation device then generates a corresponding instruction message and forwards this instruction message to the merging unit.

The corresponding operations are generally repeated frequently as a result of the input of further input signals by the user, optionally also using different modalities in a parallel manner or at the same time.

At least one disclosed embodiment of a system for processing multimodal input signals, having a merging unit of the type described above, also comprises a plurality of sensor devices. These sensor devices are set up to acquire input signals as sensor data. In this case, at least two of the sensor devices are assigned to different modalities. One sensor device may be, for example, a camera for acquiring gestures of a user or for acquiring a pupil movement of a user. A further sensor device can be designed to record spoken language. Finally, a sensor device may also be a touch-sensitive input device, for example, a touchscreen or touchpad.

The system also comprises at least one sensor data evaluation device. The latter is set up to receive sensor data from one or more of the sensor devices, to recognize instructions for applications which can be coupled to the merging unit from the sensor data and to forward instruction messages indicating the respective instruction to the merging unit.

At least one sensor data evaluation device may be set up, for example, to extract gestures of a user as input signals from image data acquired by means of a camera and to use said gestures to recognize a corresponding instruction for an application which can be coupled to the merging unit. This sensor data evaluation device or another sensor data evaluation device may also be set up to extract an eye movement of a user as input signals from image data acquired by means of the camera and to use said eye movement to recognize an instruction for applications which can be coupled to the merging unit. Furthermore, a sensor data evaluation device of the type mentioned may be set up to extract voice commands input by a user as input signals from recorded voice data and to use said voice commands to recognize an instruction for an application which can be coupled to the merging unit. Finally, there may be a sensor data evaluation device which is set up to extract contact-bound input gestures which have been input by a user, for example, tapping, pulling, pushing, swiping or the like, as input signals from acquired touch data and to use said input gestures to recognize an instruction for an application which can be coupled to the merging unit.

The system can also comprise at least one preprocessor which is set up to preprocess, for example, smooth, instruction messages received from the at least one sensor data evaluation device and to then forward them to the merging unit.

A system described above can be set up to assist with the operation or control of a vehicle assistance system, for example, a navigation system, of a motor vehicle.

The various disclosed embodiments which are mentioned in this application can be combined with one another, unless stated otherwise in the individual case.

FIG. 1 shows a system 40 for processing multimodal input signals. In this case, the multimodal input signals can be acquired via different sensor devices 10, 12, 14, 16 which form a first level of the system. One sensor device 10 is set up to acquire voice data. Various camera devices 12, 14 can capture, on the one hand, pupil size and movement of a user and, on the other hand, gestures of a user, for example, gestures of a hand or of the fingers of a hand, i.e., image data. A touchpad 16 can acquire touch-related input gestures.

A plurality of sensor data evaluation devices 18, 20, 22 are available on a second level. In this case, each sensor device 10, 12, 14, 16 is assigned a sensor data evaluation device 18, 20, 22 which is set up to evaluate the sensor data acquired by the sensor device 10, 12, 14, 16.

The sensor data evaluation device 18, for example, comprises a voice recognition functionality for evaluating voice data. The sensor data evaluation device 20 is set up to process image data and comprises, for this purpose, an image recognition application which is set up to process various types of image data with regard to input signals which can be recognized therein. The sensor data evaluation device 22 is set up to evaluate input signals stated via the touch-sensitive sensor device 16.

In this case, the sensor data are generally evaluated on the basis of predefined patterns or gestures to be recognized or predefined vocabulary to be recognized. The voice recognition device of the sensor data evaluation device 18 is able, for example, to recognize a predefined set of specific input commands and to assign an instruction assigned to the command to each of these input commands. In a similar manner, specific gestures of the hand or of the fingers, which are directly assigned to corresponding instructions, are predefined for the image recognition device of the sensor data evaluation device 20, for example. An instruction for scrolling further in a document or a menu, for example, can be assigned to a voice command of "further". The same instruction can also be assigned to a predefined hand gesture, for example, a fast swiping movement from right to left.

The sensor data evaluation devices 18, 20, 22 are set up to forward a recognized instruction as an instruction message to the merging unit 26 or to a preprocessor 24 connected upstream of the merging unit 26. The merging unit 26 and the optional preprocessor 24 form a third level of the system 40.

The preprocessor 24 is set up to preprocess instruction messages. Instruction messages, for example, which relate to the viewing position of a user and have been derived on the basis of pupil movements of a user detected by the sensor device 12 are generally transmitted from the sensor data evaluation device 20 to the preprocessor 24 or to the merging unit 26 at a high update frequency of approximately 30 Hz. The viewing positions which are transmitted via these instruction messages do not always result in a smooth or continuous description of the eye movement but are often rather discontinuous or "bumpy" on account of natural characteristics of the human eye. To obtain a smooth and continuous course of a cursor, for example, which is controlled via such a viewing direction, corresponding smoothing can be carried out inside the preprocessor 24. The corresponding instruction messages are then forwarded from the preprocessor to the merging unit 26 on the basis of the smoothed viewing coordinate parameters. In the preprocessor 24 mentioned, various image smoothing algorithms can be used for this purpose, i.e., using suitable filters (low-pass). Further input parameters may likewise be used by such smoothing algorithms, for example, how greatly the eye position changes between successive instruction messages. If a detected change is very high, it is possible to temporarily dispense with filtering by means of the low-pass filter since otherwise the resulting cursor course "lags" too much, that is to say has a discernible delay which is disruptive for the user.

The received instruction messages are then merged in the merging unit 26 in the manner described in detail below with reference to FIG. 2. Those instructions which survive the merging process, that is to say result from a merging operation, are forwarded from the merging unit 26 to at least one of the various applications 28, 30, 32 coupled to the merging unit.

The applications 28, 30, 32 on a fourth level of the system process the instructions in a specific manner in each case, for example, for the purpose of controlling a graphical user interface (GUI) 34, 36 coupled to the respective application.

The preprocessor 24 and the merging unit 26 are combined in a multimodal server 38. Such a multimodal server 38 may be present in a motor vehicle, for example, and may be used to process multimodal input signals which have been acquired via a number of sensors 10, 12, 14, 16 described above to thereby control or operate a vehicle assistance system, for example.

Operations of at least one disclosed embodiment of a method for processing multimodal input signals are described by way of example below with reference to FIG. 2.

In operation at S1, the user of the system 40 inputs an input signal, for example, by uttering an input command which is acquired by a corresponding sensor device 10 in operation at S2 and is recognized by a corresponding sensor data evaluation device 18 in operation at S3. In operation at S4, the sensor data evaluation device 18 generates an instruction message which indicates the corresponding instruction and forwards this instruction message to the merging unit 26.

Figure 2:
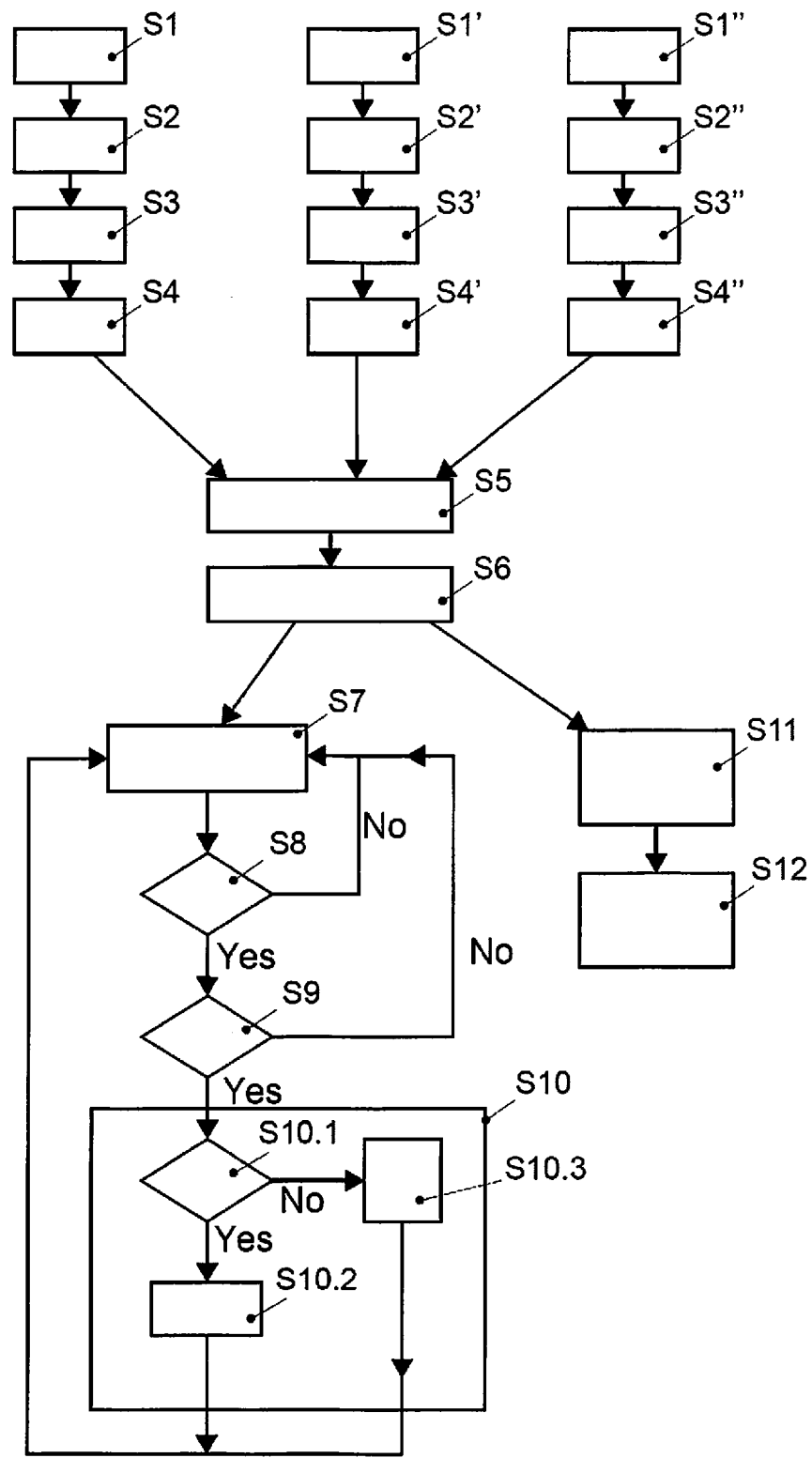
FIG. 2 shows operations of a disclosed embodiment of a method for processing multimodal input signals.

In a parallel manner or at least in an overlapping manner in terms of time, or else at an interval of time and not in an overlapping manner, further inputs may be made by the user via other modalities, for example, via input gestures, via the viewing direction or via the input on the touchpad 16, as is indicated in FIG. 2 with respect to the operation s at S1' to S4' and S1" to S4".

Three processing stages can now be fundamentally distinguished in the merging unit 26 for the further processing of instruction messages.

In a first stage, the instruction messages are received by the merging unit in operation at S5 and a candidate object is generated for each of the received instruction messages in operation at S6.

In this case, the candidate object indicates the corresponding instruction contained in the instruction message and comprises a validity time specification of the candidate object, which indicates a validity time of the candidate object. This validity time is also referred to as a validity period. The candidate object may also comprise a weighting of the candidate object.

In addition to indicating the instruction, an instruction message, as is received by the merging unit in operation at S5, comprises further parameters, for example, a sensor device parameter which indicates on the basis of which sensor data (voice data, image data etc.) the instruction message has been recognized. An application parameter of the instruction message indicates which of the applications 28, 30, 32 (compare FIG. 1) the application indicated in the instruction message is addressed to. The instruction message may also comprise an acquisition time parameter. This parameter describes an interval of time within which sensor data have been acquired by a sensor device, on the basis of which sensor data the instruction message has been generated. A further time-dependent parameter is the recognition time parameter. This parameter specifies a time at which a corresponding sensor data evaluation device has recognized the instruction indicated in the instruction message from the corresponding sensor data. On the basis of these last-mentioned time-dependent parameters, the merging unit 26 can determine the validity time of a candidate object. This validity time can be determined, for example, using a minimum service life (minTTL), that is to say a first interval of time, and a maximum service life (maxTTL), that is to say a second interval of time, each with respect to a common starting time.

In addition to the parameters mentioned, the instruction message also generally comprises a confidence parameter. This parameter specifies how reliably the sensor data evaluation device has recognized the indicated instruction from the respective sensor data. The merging unit 26 determines the weighting of a candidate object on the basis of this confidence parameter. For example, a weight parameter "weight" of between 0 and 1 can be allocated to the candidate object in a first operation. This weight parameter "weight" is then multiplied by the confidence parameter "conf". This results in the weighting "score" of the candidate object: score:=conf*weight.

In a second processing stage, candidate objects which have been generated are merged in the manner described below. In this case, compatible instructions which occur virtually at the same time are combined to prevent unintentional repeated execution. The merging process also makes it possible to delete instructions which are in conflict with other instructions and are possibly based on incorrect acquisition or recognition. This makes it possible to ensure robust recognition and processing of input signals and input signals which have been input in a parallel manner or at the same time via different modalities.

In operation at S7, a first candidate object and a second candidate object are selected from the set of those candidate objects whose validity period has not yet expired.

In operation at S8, a check is carried out to determine whether the validity period of the first candidate object overlaps the validity period of the second candidate object. If this is not the case, new candidate objects are selected in operation at S7. To simplify the finding of temporally overlapping candidate objects, the candidate objects may be sorted, for example, in temporal dependence on their respective validity periods.

If the corresponding validity periods overlap, a check is carried out in operation at S9 to determine whether the first instruction indicated by the first candidate object competes with the instruction indicated by the second candidate object. If this is not the case, both candidate objects result from the merging operation unchanged. The merging method is continued with operation at S7.

In contrast, if there are competing instructions, they are merged, as indicated with respect to operation at S10.

In sub-operation at S10.1, a check is carried out to determine whether the first instruction is in conflict with the second instruction. If this is the case, that candidate object of the two candidate objects which has the lower weighting is deleted in sub-operation at S10.2. Alternatively, provision may be made for both candidate objects to be deleted if their weighting respectively does not exceed a predefined minimum weighting. Provision may also be made for both candidate objects to be deleted when a difference between the weightings respectively assigned to the candidate objects does not exceed a predefined minimum difference.

The candidate object which has not been deleted continues to participate in the merging process, which is continued with operation at S7, provided that its validity period has not expired in the meantime.

If the first instruction is compatible with the second instruction, a merged candidate object which replaces the first and second candidate objects is formed in sub-operation at S10.3.

Compatible instructions are present when the first instruction and the second instruction are identical. In this case, the merged application indicates the corresponding application. The validity period and the weighting of the merged candidate object are each formed on the basis of the validity periods and the weightings of the first and second candidate objects. In this case, the validity period of the merged candidate object can correspond, for example, on the one hand, to one of the validity periods of the two merged candidate objects or else may be formed from the combination or the intersection of the corresponding validity periods. In an alternative manner, the validity period of the merged candidate object can also be derived from at least one of the validity periods of the merged candidate objects. The weighting of the merged candidate object generally exceeds the weighting of the first and second candidate objects. The priority of the merged candidate object is therefore boosted. The merged candidate object is now supplied to the merging process again, beginning with operation at S7. The two merged candidate objects are not considered any further.

The merging process, that is to say operation s at S7 to S10, can be continuously carried out in the merging unit 26 as long as there are candidate objects with an active validity period.

In a third processing stage, beginning with operation at S11, those candidate objects which have not yet been deleted and whose validity period has expired and which consequently no longer participate in the merging process in operation s at S7 to S10 are now considered. A candidate object is selected from this set in operation at S11.

In operation at S12, the instruction indicated by the candidate object is forwarded to an application 28, 30, 32 which is suitable or provided for the purpose of executing the instruction. In this case, the forwarding can be controlled via the above-mentioned application parameter of the candidate object.

The processing of the instruction by the application itself is now application-specific and is no longer the subject matter of the method described in the present case.

Embodiments are stated below in the numbered paragraphs:

1. A method in a merging unit of a system for processing multimodal input signals may comprise the following operations of:
   receiving instruction messages each indicating an instruction which can be executed by an application which can be coupled to the merging unit;
   for at least two of the instruction messages: generating a candidate object for the instruction message, the candidate object indicating the instruction and comprising a validity time specification of the candidate object,
   merging two of the candidate objects if the validity time specifications of these candidate objects indicate overlapping validity times, and
   forwarding an instruction to the application, which instruction is indicated by a candidate object which results from the merging operation.

2. In the method according to paragraph 1, the candidate objects can result from the merging operation unchanged if the instructions indicated by the respective candidate objects do not compete.

3. The method according to paragraph 1 or 2 can comprise the following operations of:
   receiving a first instruction message from a first sensor data evaluation device, the first instruction message indicating a first instruction which can be executed by an application which can be coupled to the merging unit;
   generating a first candidate object for the first instruction message by means of the merging unit, the first candidate object indicating the first instruction and comprising a validity time specification of the first candidate object and a weighting of the first candidate object;
   receiving a second instruction message from a second sensor data evaluation device, the second instruction message indicating a second instruction which can be executed by an application which can be coupled to the merging unit;
   generating a second candidate object for the second instruction message, the second candidate object indicating the second instruction and comprising a validity time specification of the second candidate object and a weighting of the second candidate object, and
   merging the first candidate object with the second candidate object on the basis of the weighting of the first candidate object and the weighting of the second candidate object if the validity time specification of the first candidate object indicates a first validity time which overlaps a second validity time indicated by the validity time specification of the second candidate object and if the first instruction competes with the second instruction.

4. In the method according to paragraph 3, the first candidate object can be deleted or the second candidate object can be deleted or the first candidate object and the second candidate object can be deleted in the operation of merging the first candidate object with the second candidate object if the first instruction is in conflict with the second instruction.

5. In the method according to paragraph 3, a merged candidate object can be formed from the first candidate object and the second candidate object in the merging operation if the first instruction and the second instruction are compatible,
   the instruction indicated by the merged candidate object being derived from the first instruction or from the second instruction or from the first instruction and the second instruction, and
   the validity time specification of the merged candidate object being derived from the validity time specification of the first candidate object or from the validity time specification of the second candidate object or from the validity time specification of the first candidate object and the validity time specification of the second candidate object, and
   the weighting of the merged candidate object being derived from the weighting of the first candidate object or from the weighting of the second candidate object or from the weighting of the first candidate object and the weighting of the second candidate object.

6. In the method according to paragraph 5, the instruction indicated by the merged candidate object may correspond to the first instruction if the first instruction matches the second instruction.

7. In the method according to paragraph 5, the instruction indicated by the merged candidate object may correspond to the first instruction or to the second instruction if the first instruction is specified by one or more first instruction parameters and the second instruction is specified by one or more second instruction parameters and corresponding first and second instruction parameters are each within a predefined similarity tolerance range.

8. In the method according to paragraph 5, if the second instruction does not correspond to the first instruction, the first instruction being specified by one or more first instruction parameters and the second instruction being specified by one or more second instruction parameters and corresponding first and second instruction parameters each being within a predefined compatibility tolerance range, the instruction indicated by the merged candidate object can be specified by one or more third instruction parameters which are each within the corresponding comparability tolerance range with respect to corresponding first and second instruction parameters.

9. In the method according to at least one of paragraphs 5 to 8, the validity time specification of the merged candidate object can correspond to the validity time specification of the first candidate object or to the validity time specification of the second candidate object or can indicate a validity time which includes an intersection of the validity time of the first candidate object with the validity time of the second candidate object, or can indicate a validity time which is included in the combination of the validity time of the first candidate object with the validity time of the second candidate object.

10. In the method according to at least one of paragraphs 5 to 9, the weighting of the merged candidate object can exceed the weighting of the first candidate object and the weighting of the second candidate object.

11. In the method according to at least one of paragraphs 1 to 10, the validity time specification of the first candidate object can be generated on the basis of the first instruction message.

12. In the method according to at least one of paragraphs 1 to 11, the validity time specification of the first candidate object can be generated on the basis of a modality which is assigned a first sensor device which has acquired sensor data, on the basis of which the first sensor data evaluation device has generated the first instruction message.

13. In the method according to at least one of paragraphs 3 to 12, the weighting of the first candidate object can be generated on the basis of the first instruction message.

14. In the method according to at least one of paragraphs 3 to 13, the weighting of the first candidate object can be generated on the basis of a modality which is assigned a first sensor device which has acquired sensor data, on the basis of which the first sensor data evaluation device has generated the first instruction message.

15. In the method according to at least one of paragraphs 1 to 14, a received instruction message may comprise a sensor device parameter which indicates a sensor device which has provided sensor data, on the basis of which a sensor data evaluation device has generated the instruction message.

16. In the method according to at least one of paragraphs 1 to 15, a received instruction message may comprise an application parameter which specifies one or more applications which are set up or provided for the purpose of executing the instruction.

17. In the method according to at least one of paragraphs 1 to 16, a received instruction message may comprise an acquisition time parameter which specifies an acquisition interval of time within which sensor data have been acquired by a sensor device, on the basis of which sensor data a sensor data evaluation device has generated the instruction message.

18. In the method according to at least one of paragraphs 1 to 17, a received instruction message may comprise a recognition time parameter which specifies a recognition time at which a sensor data evaluation device has recognized the instruction indicated in the instruction message from sensor data received by a sensor device.

19. In the method according to paragraph 17 or 18, the validity time specification of a candidate object can be determined on the basis of the acquisition time parameter.

20. In the method according to paragraphs 17 to 19, the validity time specification of a candidate object can be determined on the basis of the recognition time parameter.

21. In the method according to at least one of paragraphs 1 to 20, a received instruction message can comprise a confidence parameter which specifies how reliably a sensor data evaluation device has recognized the instruction indicated in the instruction message from sensor data received by a sensor device.

22. In the method according to paragraph 21, a weighting of a candidate object can be determined on the basis of the confidence parameter.

23. In the method according to at least one of paragraphs 1 to 22, a first sensor device which has acquired sensor data, on the basis of which a first sensor data evaluation device has generated a first instruction message, can be assigned to a first modality which differs from a second modality assigned to a second sensor device which has acquired sensor data, on the basis of which a second sensor data evaluation device has generated a second instruction message.

24. The method according to at least one of paragraphs 1 to 23 can comprise the following further operation for each candidate object which has not been deleted before the expiry of its validity time:
the instruction indicated by the candidate object is forwarded to an application which is coupled to the merging unit and is suitable or intended to execute the instruction.

25. In the method according to at least one of paragraphs 1 to 24, a candidate object can also comprise a merging parameter which indicates whether and—if so—the time at which the candidate object is provided for potential merging with a further candidate object.

26. In the method according to paragraph 25, the merging parameter may indicate that the instruction indicated by the candidate object is immediately forwarded to an application which is coupled to the merging unit and is suitable or intended to execute the instruction.

27. In the method according to paragraph 26, the merging parameter may also indicate that the candidate object, after the instruction indicated by the candidate object has been forwarded, is provided for potential merging with those further candidate objects which indicate a further instruction which is in conflict with the instruction indicated by the candidate object.

28. In the method according to paragraph 26, the merging parameter can also indicate that the candidate object, after the instruction indicated by the candidate object has been forwarded, is not provided for potential merging with further candidate objects.

29. In the method according to paragraph 25, the merging parameter may indicate that the instruction indicated by the candidate object is forwarded, after expiry of the validity time of the candidate object, to an application which is coupled to the merging unit and is suitable or intended to execute the instruction, and that the first candidate object, until the expiry of its validity time, is provided for potential merging with those further candidate objects which indicate a further instruction which is in conflict with the instruction indicated by the candidate object.

30. In the method according to at least one of paragraphs 1 to 29, communication between a sensor device and a sensor data evaluation device for the purpose of transmitting sensor data acquired by the sensor device, or communication between a sensor data evaluation device and the merging unit for the purpose of transmitting an instruction message, or communication between the merging unit and an application coupled to the merging unit for the purpose of forwarding an instruction can be carried out using sockets.

31. In the method according to at least one of paragraphs 1 to 30, the instruction messages may be coded in the JSON data format.

32. The method according to at least one of paragraphs 1 to 31 can comprise the following further operations before a first instruction message is received:
   a first input signal which has been input by a user is acquired as sensor data by a first sensor device;
   a first sensor data evaluation device receives the sensor data from the first sensor device and recognizes an instruction for an application which can be coupled to the merging unit;
   the first sensor data evaluation device generates a first instruction message; and
   the first instruction message is forwarded to the merging unit.

33. A merging unit for a system for processing multimodal input signals can be set up
   to receive instruction messages from at least one sensor data evaluation device, which messages each indicate an instruction which can be executed by the application which can be coupled to the merging unit;
   to respectively generate a candidate object for the instruction message for at least two of the instruction messages, the candidate object respectively indicating the instruction and respectively comprising a validity time specification of the candidate object,
   to merge two of the candidate objects if the validity time specifications of these candidate objects indicate overlapping validity times, and
   to forward an instruction to the application, which instruction is indicated by a candidate object which results from the merging operation.

34. The merging unit according to paragraph 33 may be set up and intended to carry out the method according to at least one of paragraphs 2 to 32.

35. A system for processing multimodal input signals, having a merging unit according to paragraph 33 or 34, can comprise the following components:
   a plurality of sensor devices which are set up to acquire input signals as sensor data, at least two of the sensor devices being assigned to different modalities;
   at least one sensor data evaluation device which is set up to receive sensor data from the sensor devices, to recognize instructions for applications which can be coupled to the merging unit from the sensor data and to transmit instruction messages indicating the instructions to the merging unit.

36. In the system according to paragraph 35, one of the sensor devices can be a camera.

37. In the system according to paragraph 36, the at least one sensor data evaluation device can be set up to extract gestures of a user as input signals from image data acquired by means of the camera and to use said gestures to recognize an instruction for applications which can be coupled to the merging unit.

38. In the system according to paragraph 36 or 37, the at least one sensor data evaluation device may be set up to extract an eye movement of a user as input signals from image data acquired by means of the camera and to use said eye movement to recognize an instruction for applications which can be coupled to the merging unit.

39. In the system according to at least one of paragraphs 35 to 38, one of the sensor devices can be designed to record spoken language.

40. In the system according to paragraph 39, the at least one sensor data evaluation device can be set up to extract voice commands which have been input by a user as input signals from recorded voice data and to use said voice commands to recognize an instruction for applications which can be coupled to the merging unit.

41. In the system according to at least one of paragraphs 35 to 40, one of the sensor devices can be a touch-sensitive input device, i.e., a touchscreen or touchpad.

42. In the system according to paragraph 41, the at least one sensor data evaluation device can be set up to extract contact-bound input gestures which have been input by a user as input signals from touch data acquired by means of the input device and to use said input gestures to recognize an instruction for applications which can be coupled to the merging unit.

43. The system according to at least one of paragraphs 35 to 42 can comprise at least one preprocessor which is set up to preprocess instruction messages received from the at least one sensor data evaluation device and to forward them to the merging unit.

44. A motor vehicle can comprise a system according to at least one of paragraphs 35 to 43, the system being set up to assist with the operation or control of a vehicle assistance system.

LIST OF REFERENCE SYMBOLS

10 Sensor device (voice)
12 Sensor device (image)
14 Sensor device (image)
16 Sensor device (touch)
18 Sensor data evaluation device (voice recognition)
20 Sensor data evaluation device (image recognition)
22 Sensor data evaluation device (touch recognition)
24 Preprocessor
26 Merging unit
28 Application
30 Application
32 Application
34 GUI
36 GUI
38 Multimodal server
40 System S . . . , S . . . ', S . . . " Operations of a method for processing multimodal input signals

The invention claimed is:

1. A method in a merging unit of a system for processing multimodal input signals, the method comprising:
receiving instruction messages each indicating an instruction to be executed by an application to be coupled to the merging unit;
generating a candidate object for the instruction message for at least two of the instruction messages, the candidate object indicating the instruction and comprising a validity time specification of the candidate object;
merging two of the candidate objects in response to the validity time specifications of these candidate objects indicate overlapping validity times; and
forwarding an instruction to the application, which instruction is indicated by a candidate object which results from the merging operation, wherein the candidate objects result from the merging operation unchanged in response to the instructions indicated by the respective candidate objects not competing;
receiving a first instruction message from a first sensor data evaluation device, the first instruction message indicating a first instruction which can be executed by an application which can be coupled to the merging unit;
generating a first candidate object for the first instruction message, the first candidate object indicating the first instruction and comprising a validity time specification of the first candidate object and a weighting of the first candidate object;
receiving a second instruction message from a second sensor data evaluation device, the second instruction message indicating a second instruction to be executed by an application which can be coupled to the merging unit;
generating a second candidate object for the second instruction message, the second candidate object indicating the second instruction and comprising a validity time specification of the second candidate object and a weighting of the second candidate object; and
merging the first candidate object with the second candidate object based on the weighting of the first candidate object and the weighting of the second candidate object in response to the validity time specification of the first candidate object indicates a first validity time which overlaps a second validity time indicated by the validity time specification of the second candidate object and in response to the first instruction competes with the second instruction.

2. The method of claim 1, wherein the first candidate object is deleted or the second candidate object is deleted or the first candidate object and the second candidate object are deleted in the operation of merging the first candidate object with the second candidate object in response to the first instruction being in conflict with the second instruction.

3. The method of claim 1, wherein a merged candidate object is formed from the first candidate object and the second candidate object in the merging operation in response to the first instruction and the second instruction being compatible,
the instruction indicated by the merged candidate object is derived from the first instruction or from the second instruction or from the first instruction and the second instruction,
the validity time specification of the merged candidate object is derived from the validity time specification of the first candidate object or from the validity time specification of the second candidate object or from the validity time specification of the first candidate object and the validity time specification of the second candidate object, and
the weighting of the merged candidate object is derived from the weighting of the first candidate object or from the weighting of the second candidate object or from the weighting of the first candidate object and the weighting of the second candidate object.

4. The method of claim 1, wherein the validity time specification of a candidate object is generated on the basis of the corresponding instruction message and/or based on a modality which is assigned a sensor device which has acquired sensor data, based on which a sensor data evaluation device that generated the instruction message.

5. The method of claim 1, wherein the weighting of a candidate object is generated based on the corresponding instruction message and/or based on a modality which is assigned a sensor device which has acquired sensor data, based on which a sensor data evaluation device that has generated the instruction message.

6. The method of claim 1, wherein a received instruction message comprises an acquisition time parameter which specifies an acquisition interval of time within which sensor data have been acquired by a sensor device, based on which sensor data a sensor data evaluation device has generated the instruction message, and/or in that a received instruction message comprises a recognition time parameter which specifies a recognition time at which a sensor data evaluation device has recognized the instruction indicated in the instruction message from sensor data received by a sensor device, the validity time specification of a candidate object is determined on the basis of the acquisition time parameter and/or the recognition time parameter.

7. The method of claim 1, wherein a received instruction message comprises a confidence parameter which specifies how reliably a sensor data evaluation device has recognized the instruction indicated in the instruction message from sensor data received by a sensor device, the weighting of a candidate object is determined based on the confidence parameter.

8. The method of claim 1, wherein a first sensor device which has acquired sensor data, on the basis of which a first sensor data evaluation device has generated a first instruction message, is assigned to a first modality which differs from a second modality assigned to a second sensor device which has acquired sensor data, based on which a second sensor data evaluation device has generated a second instruction message.

9. The method of claim 1, wherein a candidate object also comprises a merging parameter which indicates the form in which and/or the time at which the candidate object is provided for potential merging with a further candidate object.

10. The method of claim 1, further comprising the following operations before a first instruction message is received:
acquiring a first input signal which has been input by a user as sensor data by a first sensor device;
receiving the sensor data from the sensor device by a first sensor data evaluation device and recognizing an instruction for an application which can be coupled to the merging unit;
generating a first instruction message by the first sensor data evaluation device; and forwarding the first instruction message to the merging unit.

11. A hardware system including a merging unit for a system for processing multimodal input signals, wherein the merging unit:
receives instruction messages each indicating an instruction which can be executed by an application which can be coupled to the merging unit;
respectively generates a candidate object for the instruction message for at least two of the instruction messages, the candidate object respectively indicating the instruction and respectively comprising a validity time specification of the candidate object;
merging two of the candidate objects if the validity time specifications of these candidate objects indicate overlapping validity times; and
forwards an instruction to the application, which instruction is indicated by a candidate object which results from the merging operation, wherein the candidate objects result from the merging operation unchanged in response to the instructions indicated by the respective candidate objects not competing;
receives a first instruction message from a first sensor data evaluation device, the first instruction message indicating a first instruction which can be executed by an application which can be coupled to the merging unit;
generates a first candidate object for the first instruction message, the first candidate object indicating the first instruction and comprising a validity time specification of the first candidate object and a weighting of the first candidate object;
receives a second instruction message from a second sensor data evaluation device, the second instruction message indicating a second instruction to be executed by an application which can be coupled to the merging unit;
generates a second candidate object for the second instruction message, the second candidate object indicating the second instruction and comprising a validity time specification of the second candidate object and a weighting of the second candidate object; and
merges the first candidate object with the second candidate object based on the weighting of the first candidate object and the weighting of the second candidate object in response to the validity time specification of the first candidate object indicates a first validity time which overlaps a second validity time indicated by the validity time specification of the second candidate object and in response to the first instruction competes with the second instruction.

12. A hardware system included in a motor vehicle, the system comprising:
a merging unit for processing multimodal input signals, the merging unit being implemented in a multimodal server included in the motor vehicle to process the multimodal input signals to control or operate a vehicle assistance system of the motor vehicle, wherein the merging unit:
receives instruction messages each indicating an instruction which can be executed by an application which can be coupled to the merging unit;
respectively generates a candidate object for the instruction message for at least two of the instruction messages, the candidate object respectively indicating the instruction and respectively comprising a validity time specification of the candidate object;
merges two of the candidate objects if the validity time specifications of these candidate objects indicate overlapping validity times; and
forwards an instruction to the application, which instruction is indicated by a candidate object which results from the merging operation, wherein the candidate objects result from the merging operation unchanged in response to the instructions indicated by the respective candidate objects not competing;
receives a first instruction message from a first sensor data evaluation device, the first instruction message indicating a first instruction which can be executed by an application which can be coupled to the merging unit;
generates a first candidate object for the first instruction message, the first candidate object indicating the first instruction and comprising a validity time specification of the first candidate object and a weighting of the first candidate object;
receives a second instruction message from a second sensor data evaluation device, the second instruction message indicating a second instruction to be executed by an application which can be coupled to the merging unit;
generates a second candidate object for the second instruction message, the second candidate object indicating the second instruction and comprising a validity time specification of the second candidate object and a weighting of the second candidate object; and
merges the first candidate object with the second candidate object based on the weighting of the first candidate object and the weighting of the second candidate object in response to the validity time specification of the first candidate object indicates a first validity time which overlaps a second validity time indicated by the validity time specification of the second candidate object and in response to the first instruction competes with the second instruction;
a plurality of sensor devices which acquire the input signals as sensor data, at least two of the sensor devices being assigned to different modalities; and
at least one sensor data evaluation device which receives sensor data from the sensor devices, to recognize instructions for applications which can be coupled to the merging unit from the sensor data and to transmit instruction messages indicating the instructions to the merging unit.

13. A motor vehicle having a system according to claim 12, wherein the system assists with the operation or control of a vehicle assistance system of the motor vehicle.

* * * * *